(12) United States Patent
Nakayama et al.

(10) Patent No.: US 10,196,893 B2
(45) Date of Patent: Feb. 5, 2019

(54) INTER-TOOL COMMUNICATION FLOW CONTROL IN TOOLBUS SYSTEM OF CABLE TELEMETRY

(71) Applicant: Schlumberger Technology Corporation, Sugar Land, TX (US)

(72) Inventors: Takeaki Nakayama, Machida (JP); Yuichi Kobayashi, Machida (JP); Yasumasa Fujisawa, Sagamihara (JP); Thi Huong Lien Nguyen, Yokohama (JP); Tsubasa Tanaka, Yokosuka (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 96 days.

(21) Appl. No.: 14/366,265

(22) PCT Filed: Dec. 19, 2012

(86) PCT No.: PCT/US2012/070526
§ 371 (c)(1),
(2) Date: Jun. 18, 2014

(87) PCT Pub. No.: WO2013/101581
PCT Pub. Date: Jul. 4, 2013

(65) Prior Publication Data
US 2014/0333452 A1  Nov. 13, 2014

Related U.S. Application Data

(60) Provisional application No. 61/581,097, filed on Dec. 29, 2011.

(51) Int. Cl.
*E21B 1/00* (2006.01)
*E21B 47/12* (2012.01)
(Continued)

(52) U.S. Cl.
CPC ............ *E21B 47/124* (2013.01); *E21B 47/12* (2013.01); *G01V 11/002* (2013.01); *H04L 12/10* (2013.01); *H04L 12/40* (2013.01)

(58) Field of Classification Search
CPC .......... G01V 1/22; G01V 11/002; G01V 1/52; G01V 3/34; E21B 47/12; E21B 47/06;
(Continued)

(56) References Cited

U.S. PATENT DOCUMENTS 4,298,954 A    11/1981  Bigelow et al.
4,597,073 A    6/1986   Staples
(Continued)

FOREIGN PATENT DOCUMENTS

GB    2393364    3/2004
GB    2408432    5/2005
(Continued)

OTHER PUBLICATIONS

International Preliminary Report on Patentability issued in the related PCT application PCT/US2012/070526, dated Jul. 1, 2014 (10 pages).

*Primary Examiner* — Muhammad N Edun
*Assistant Examiner* — Jerold Murphy
(74) *Attorney, Agent, or Firm* — Eileen Pape

(57) ABSTRACT

Systems and methods for inter-tool communication in toolbus systems in cable telemetry. The systems can include downhole equipment deployable into a wellbore via a cable, The downhole equipment can include a toolbus, a toolbus master node including a buffer, and nodes operatively coupled to the toolbus master node via the toolbus. Each of the nodes includes a buffer. Of the one or more nodes, a sending node sends a message, and a receiving node receives the message via the toolbus master node and sends a buffer full message to the toolbus master node when the buffer of
(Continued)

the receiving node is full. The toolbus master node sends a buffer full message to the sending node and the receiving node when the buffer of the receiving node is full, and buffers the message at the toolbus master node until the receiving buffer is not full.

20 Claims, 5 Drawing Sheets

(51) Int. Cl.
*G01V 11/00* (2006.01)
*H04L 12/40* (2006.01)
*H04L 12/10* (2006.01)

(58) Field of Classification Search
CPC ..... E21B 47/065; E21B 47/122; H04L 29/06; H04L 5/143; G06F 5/00
See application file for complete search history.

(56) References Cited

U.S. PATENT DOCUMENTS

| | | | |
|---|---|---|---|
| 4,905,234 A | 2/1990 | Childress et al. | |
| 5,191,326 A * | 3/1993 | Montgomery | E21B 47/12 340/854.1 |
| 5,331,318 A | 7/1994 | Montgomery | |
| 5,592,438 A | 1/1997 | Rorden et al. | |
| 5,719,883 A | 2/1998 | Ayanoglu | |
| 5,784,004 A | 7/1998 | Esfahani et al. | |
| 5,838,727 A | 11/1998 | Lyon et al. | |
| 5,995,449 A | 11/1999 | Green et al. | |
| 6,061,633 A | 5/2000 | Fukuhara et al. | |
| 6,175,599 B1 | 1/2001 | Lyon et al. | |
| 6,252,518 B1 | 6/2001 | Laborde | |
| 6,310,559 B1 | 10/2001 | Laborde et al. | |
| 6,519,568 B1 | 2/2003 | Harvey et al. | |
| 6,552,665 B1 * | 4/2003 | Miyamae | E21B 47/12 340/853.3 |
| 6,580,751 B1 | 6/2003 | Gardner et al. | |
| 6,628,992 B2 | 9/2003 | Osburn, III | |
| 6,630,890 B1 | 10/2003 | Endo et al. | |
| 6,657,551 B2 | 12/2003 | Huckaba et al. | |
| 6,747,569 B2 | 6/2004 | Hill et al. | |
| 6,910,084 B2 | 6/2005 | Augustijn et al. | |
| 6,999,517 B1 | 2/2006 | Bombay et al. | |
| 7,026,952 B2 | 4/2006 | Krueger | |
| 7,042,367 B2 * | 5/2006 | Gardner | G01V 11/00 340/853.3 |
| 7,081,831 B2 | 7/2006 | Dodge | |
| 7,096,961 B2 | 8/2006 | Clark et al. | |
| 7,132,958 B2 | 11/2006 | Dodge et al. | |
| 7,181,515 B2 | 2/2007 | Lin et al. | |
| 7,193,525 B2 * | 3/2007 | Miyamae | G01V 1/52 340/853.1 |
| 7,394,752 B2 | 7/2008 | Hasegawa et al. | |
| 7,443,312 B2 | 10/2008 | Quintero et al. | |
| 7,480,207 B2 | 1/2009 | Marsh | |
| 7,787,525 B1 | 8/2010 | Clark, Jr. et al. | |
| 8,217,802 B2 | 7/2012 | Weerasinghe | |
| 9,210,067 B1 * | 12/2015 | Agarwal | H04L 45/22 |
| 2002/0178295 A1 | 11/2002 | Buczek et al. | |
| 2003/0147360 A1 | 8/2003 | Nero et al. | |
| 2004/0155794 A1 | 8/2004 | Gardner | |
| 2004/0156264 A1 | 8/2004 | Gardner et al. | |
| 2005/0046592 A1 | 3/2005 | Cooper et al. | |
| 2010/0194586 A1 | 8/2010 | Tjhang et al. | |
| 2010/0295702 A1 | 11/2010 | Zhao et al. | |
| 2011/0005835 A1 | 1/2011 | Li | |
| 2012/0268288 A1 * | 10/2012 | Cousin | G01V 11/002 340/853.1 |

FOREIGN PATENT DOCUMENTS

| | | |
|---|---|---|
| WO | 2001095517 | 12/2001 |
| WO | 2008005054 | 1/2008 |

* cited by examiner

INTER-TOOL COMMUNICATION FLOW CONTROL IN TOOLBUS SYSTEM OF CABLE TELEMETRY

BACKGROUND

The following descriptions and examples are not admitted to be prior art by virtue of their inclusion in this section.

Hydrocarbon fluids, such as oil and natural gas, may be obtained from a subterranean geologic formation, referred to as a reservoir, by drilling a well that penetrates a hydrocarbon-bearing formation. A variety of downhole tools may be used in all areas of oil and natural gas services. In some cases, downhole tools may be used in a well for surveying, drilling, and production of hydrocarbons. The downhole tools may communicate with the surface via various telemetry systems. In some cases, the downhole tools may include one or more individual modules in operative communication with one another, such as a master module and multiple slave modules.

With the increased precision of downhole tools and sensors, a relatively shorter time may be available to send increasingly larger amounts of data. In addition to new modules and assemblies being developed for downhole use on a continuing basis, toolbus systems may facilitate communication between older and newer generation modules in order to obtain the maximum service life from existing modules.

Applications of disclosed embodiments of the present disclosure are not limited to these illustrated examples, and different industrial applications may benefit from implementations of the following disclosure.

SUMMARY

In at least one aspect, the disclosure relates to a method for inter-tool communication in a toolbus system in cable telemetry. The method can include positioning downhole equipment into a wellbore via a cable. The downhole equipment includes a toolbus master node including a buffer of the toolbus master node and one or more nodes operatively coupled to the toolbus master node via a toolbus. Each of the one or more nodes includes a buffer. The method can include sending a data message to a receiving node of the one or more nodes from a sending node of the one or more nodes via the toolbus master node, sending a buffer full message from the receiving node to the toolbus master node when the buffer for the receiving node is full, forwarding the buffer full message from the toolbus master node to the sending node and the receiving node, buffering the data message at the buffer of the toolbus master node when the buffer for the receiving node is full, and sending the data message to the receiving node when the buffer of the receiving node is not full.

In at least one aspect, the disclosure relates to a system for inter-tool communication in a downhole toolbus in cable telemetry. The system can include downhole equipment deployable into a wellbore via a cable. The downhole equipment can include a toolbus, a toolbus master node including a buffer, and one or more nodes operatively coupled to the toolbus master node via the toolbus. Each of the one or more nodes includes a buffer. Of the one or more nodes, a sending node sends a message, and a receiving node (operatively coupled to the sending node via the toolbus) receives the message via the toolbus master node and sends a buffer full message to the toolbus master node when the buffer of the receiving node is full. The toolbus master node sends a buffer full message to the sending node and the receiving node when the buffer of the receiving node is full, and buffers the message at the buffer of the toolbus master node until the buffer of the receiving node is not full.

In at least one aspect, the disclosure relates to a method for bi-directional communication in a cable telemetry system. The method can include providing a cable telemetry system including a cable operatively coupling between a surface modem and a downhole modem. The downhole modem can be operatively coupled to a downhole toolstring of downhole tools. The method can include configuring one of a tool command and a tool measurement into a configured transmission for communication via the cable telemetry system, buffering the configured transmission at the surface modem, transmitting the configured transmission via the cable, buffering the configured transmission at the downhole modem, and routing the configured transmission to one tool of the downhole tools.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for inter-tool communication flow control in toolbus systems of cable telemetry are described with reference to the following figures. Like numbers are used throughout the figures to reference like features and components.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to data flow control in inter-tool communication between downhole tools. This may be performed without the necessity of routing the communication through a surface module. Inter-tool communication data flow control may include sending an uplink command message for a receiving downhole node from a sending downhole node to a master downhole node and sending a command buffer full message from the receiving downhole node to the master downhole node when a receiving node command buffer is full. The master downhole node sends a downlink command buffer full message to the sending and receiving downhole nodes, buffers the uplink command message, and sends the uplink command message to the receiving downhole node when the receiving node command buffer is not full. Additional information may be found in the related U.S. Provisional Application No. 61/581079, filed on Dec. 29, 2011 and entitled "A METHOD AND SYSTEM FOR INTER-TOOL COMMUNICATION FLOW CONTROL IN A TELEMETRY SYSTEM," the entire contents of which are hereby incorporated by reference herein in their entirety.

Figure 1:
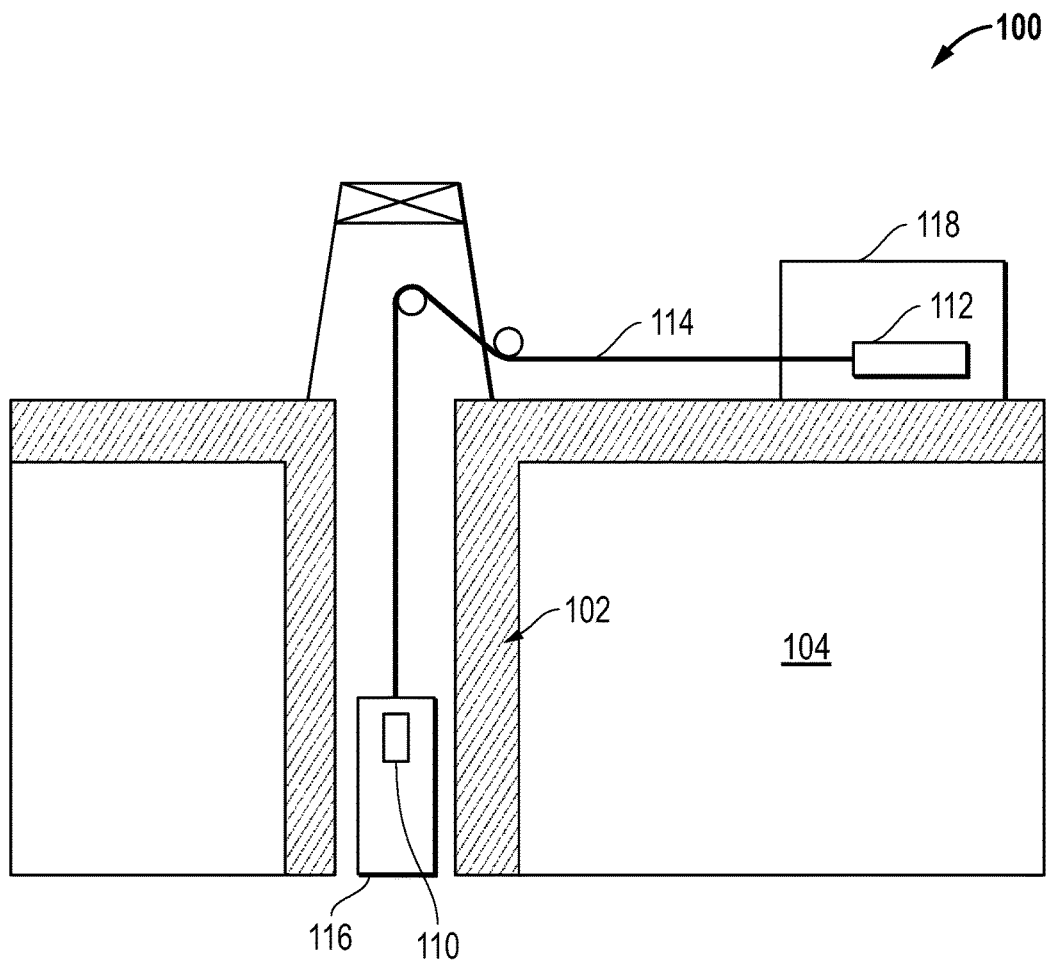
FIG. 1 is a schematic representation of a well site with a borehole traversing subsurface formations.

Referring to FIG. 1, an example embodiment wireline logging operation is illustrated with respect to the wellsite system 100 employed in a wellbore 102 traversing a sub-surface formation 104. A downhole telemetry cartridge 110 is connected to a toolstring 116. In a well-logging operation, a plurality of tools may be connected in the toolstring 116. The tools of the toolstring 116 communicate with the downhole telemetry cartridge 110 via a bi-directional electrical interface. The tools of the toolstring 116 may be connected to the telemetry cartridge 110 over a common data bus. Alternatively, each tool of the toolstring 116 may be individually, directly connected to the telemetry cartridge 110. In one embodiment, the telemetry cartridge 110 may be a separate unit, which is mechanically and electrically connected to the tools in the toolstring 116. In an alternative embodiment, the telemetry cartridge may be integrated into the housing of one of the well-logging tools of toolstring 116.

The telemetry cartridge 110 is operatively coupled to a wireline cable 114. The tools of the toolstring 116, including the telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The acquisition computer 118 may communicate with the uphole telemetry unit 112 via a bi-directional electrical interface.

The uphole telemetry unit 112 may modulate downlink commands from the acquisition computer 118 for transmission down the cable 114 to the toolstring 116 and demodulate uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and demodulate downlink commands from the surface data acquisition computer 118 for the tools of the toolstring 116.

Figure 2:
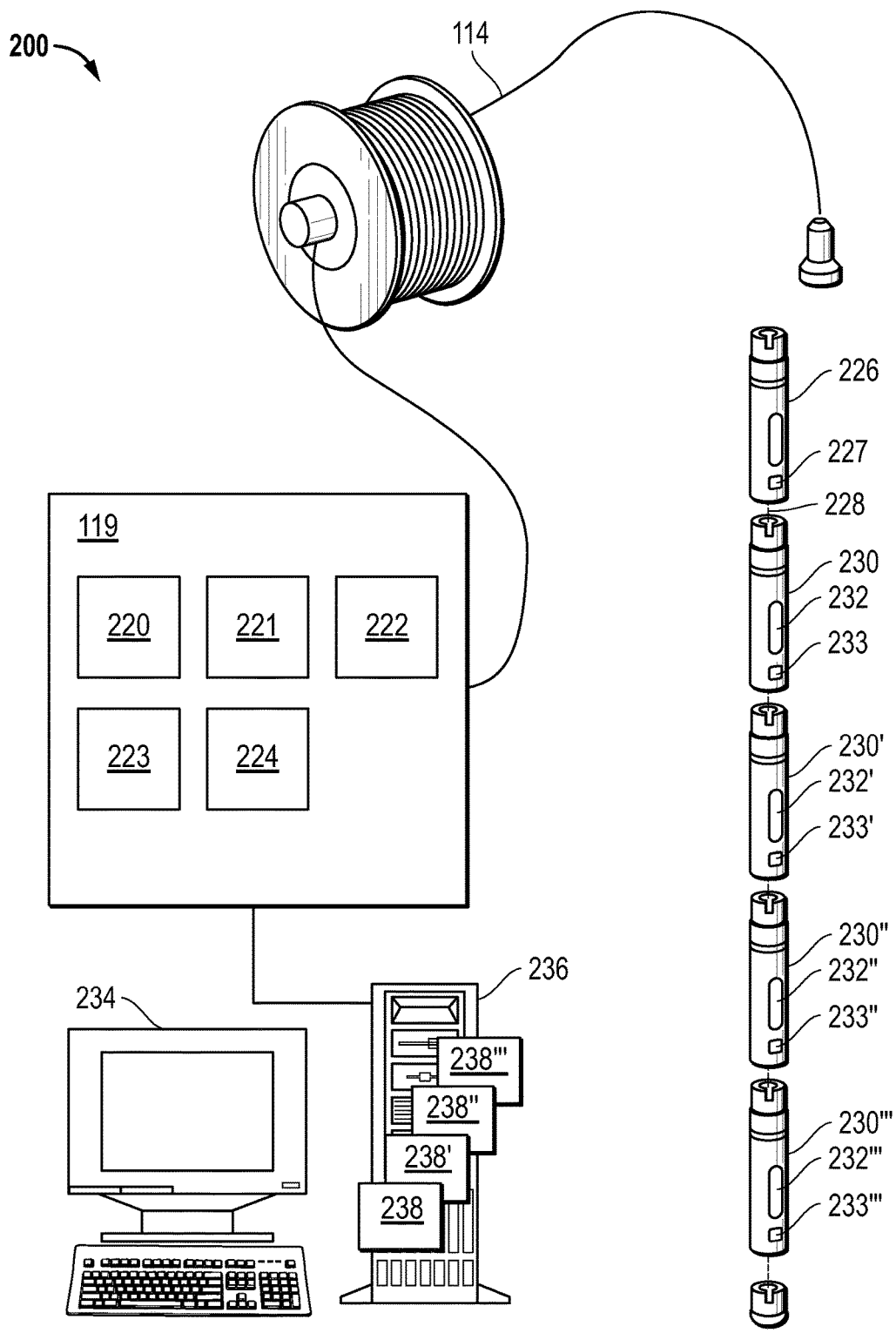
FIG. 2 illustrates schematically an example cable telemetry system including a toolbus system for monitoring subterranean formations in accordance with an embodiment of the present disclosure.

A more detailed schematic view of one example cable telemetry system 200 is shown in FIG. 2. The cable telemetry system 200 shown includes a surface acquisition module/surface modem (DTM) 220 having a telemetry interface module (TIM) 222, which can be located at the surface as a portion of, or operatively coupled to, the surface data acquisition front end 119 (a component of surface data acquisition computer 118 of FIG. 1), coupled to the wireline cable 114, a downhole modem (DTC) 226 (as a portion of the downhole telemetry cartridge 110 at the head of a toolstring 116 of FIG. 1) which includes a number of downhole tools, 230, 230', 230'', 230''', etc., each containing a respective interface package (or EIP), 232, 232', 232'', 232''', etc., through which they are in communication with the DTC 226 via a toolbus 228. The interface packages may be, for example, EIP 2.0—Enhanced Interface Package 2.0 commercially available from SCHLUMBERGER TECHNOLOGY CORPORATION (see: www.slb.com). The surface acquisition front-end unit 119 may also include various additional components, such as power module 221, depth and tension module 223, flow controller software module (FEPC) 224, etc.

The cable telemetry system 200 may handle data flows in opposite directions, i.e., from the tools, etc., via the respective interface package 232, 232', etc. and the toolbus 228, to the DTC 226 and then to the DTM 220 over the cable 114 ("uplink"), and the reverse direction from the DTM 220 to the DTC 226 and tools 230, 230', etc., over the same path ("downlink"). The cable telemetry system 200 provides a communication path from the tools, 230, 230', etc., to the DTM 220 of the data acquisition computer 118 so that data acquired by the tools, 230, 230', etc., can be processed and analyzed at the surface, as well as communication between tools 230, 230', etc. Each individual tool (230, 230', etc.) may include a node command buffer (not shown) at the interface package (232, 232', etc.), as well as a logic controller of its own (not shown), The downhole telemetry cartridge 226 can include a downhole master node controller 227 that may examine packets sent by each respective tool 230, 230', etc. The master node controller 227 may be, for example, an EIP 2.0 Master—Enhanced Fast Tool Bus 2.0 Master commercially available from SCHLUMBERGER TECHNOLOGY CORPORATION (see: www.slb.com). Data communicated in either direction may be copied and buffered at the master node controller 227, and sent to the recipient.

A surface computer 234 can store and execute a surface data dispatcher module 236 (which may be, in an embodiment, a software data routing module, such as SCHLUMBERGER™'s Maxwell Framework). The surface computer 234 can also store and execute a plurality of surface tool-specific applications 238, 238', 238'', 238''', etc. that analyze and use data obtained, respectively, by tools 230, 230', etc.

In a cable telemetry system of a given configuration, each tool (230, 230', etc.) would send data (acquired and/or timing, for example) to the downhole telemetry cartridge 226 through the toolbus 228, via the interface package 232, 232', etc. from tool node controller 233, 233', etc., components of the tool 230. The downhole telemetry cartridge 226 would in turn send the data to the TIM 222. Thus, while such a configuration may simplify the downhole telemetry, tool data may be communicated to the surface unnecessarily.

Some situations may call for communicating data or a signal from one downhole tool to another downhole tool. Such a telemetry configuration may result in the data from the sending tool being sent to the downhole telemetry cartridge 226, from which it is communicated via an uplink to the TIM 222 of the surface modem 220, then communicated from the TIM 222 via a downlink back to a receiving tool via the downhole telemetry cartridge 226. The time required for such up-and-down communication may be inefficient, for example in deep boreholes where the distance between the downhole telemetry cartridge 226 and TIM 222 can be large.

In another configuration, inter-tool communication involves communication between downhole tools and is termed "inter-tool" communication herein and includes communication between downhole tools without traveling to and from a surface module. Examples of inter-tool communication techniques are provided in commonly assigned U.S. Pat. No. 7,193,525, the entire contents of which are hereby incorporated by reference herein in their entirety. Inter-tool configurations may be directed to providing a more accurate synchronization of various events associated with downhole, tools, shorter time lags between commands and responses, and/or a smaller operational overhead.

Methods and apparatus of inter-tool communication can be implemented by examining data (including command signals) contained in an uplink data stream while the data is still local to the downhole tool. By examining the data before it travels to the surface, information sent by one or more downhole tools arid intended for other downhole tools can be extracted, copied, and transmitted to intended destinations without travelling to the surface (i.e., the TIM 222). The shorter latency period may result in better logging information and be used to provide more efficient well operation. As used herein, the term "extract" or "extracted" means to derive or obtain (information, for example) from a source.

The downhole telemetry cartridge 226 can include the downhole master node controller 227 which may examine packets sent by each respective tool 230, 230', etc., and extract the uplink inter-tool communication. When there is data sent from one downhole tool (230, 230', etc.) intended for another downhole tool (230, 230', etc.), such data may be copied and buffered at the master node controller 227, and sent to intended downhole tools without waiting for the data to travel to the surface and back down again. Any inter-tool communication data can be sent by the downhole master node controller 227, at a subsequent downlink period following the uplink period during which the data was extracted.

To realize downhole inter-tool communication, which may be used to effectively allow communication tools to send data packets in uphole and downhole directions, an enhanced downhole toolbus protocol and downhole module may be used. The downhole telemetry cartridge 226 may include an enhanced downhole telemetry cartridge (EDTC). Each individual tool (230, 230', etc.) may be equipped with an interface package 232, 232', etc, i.e., extended bus interface (XBI), a software enhanced bus interface (SERI), or a toolbus interface (BI). Further details of data extraction methods can be found, for example, in U.S. Pat. No. 7,193,525. Each individual tool (230, 230', etc.) may include a node command buffer (not shown) at the interface package 232, 232', etc., as well as a tool node controller.

Figure 3:
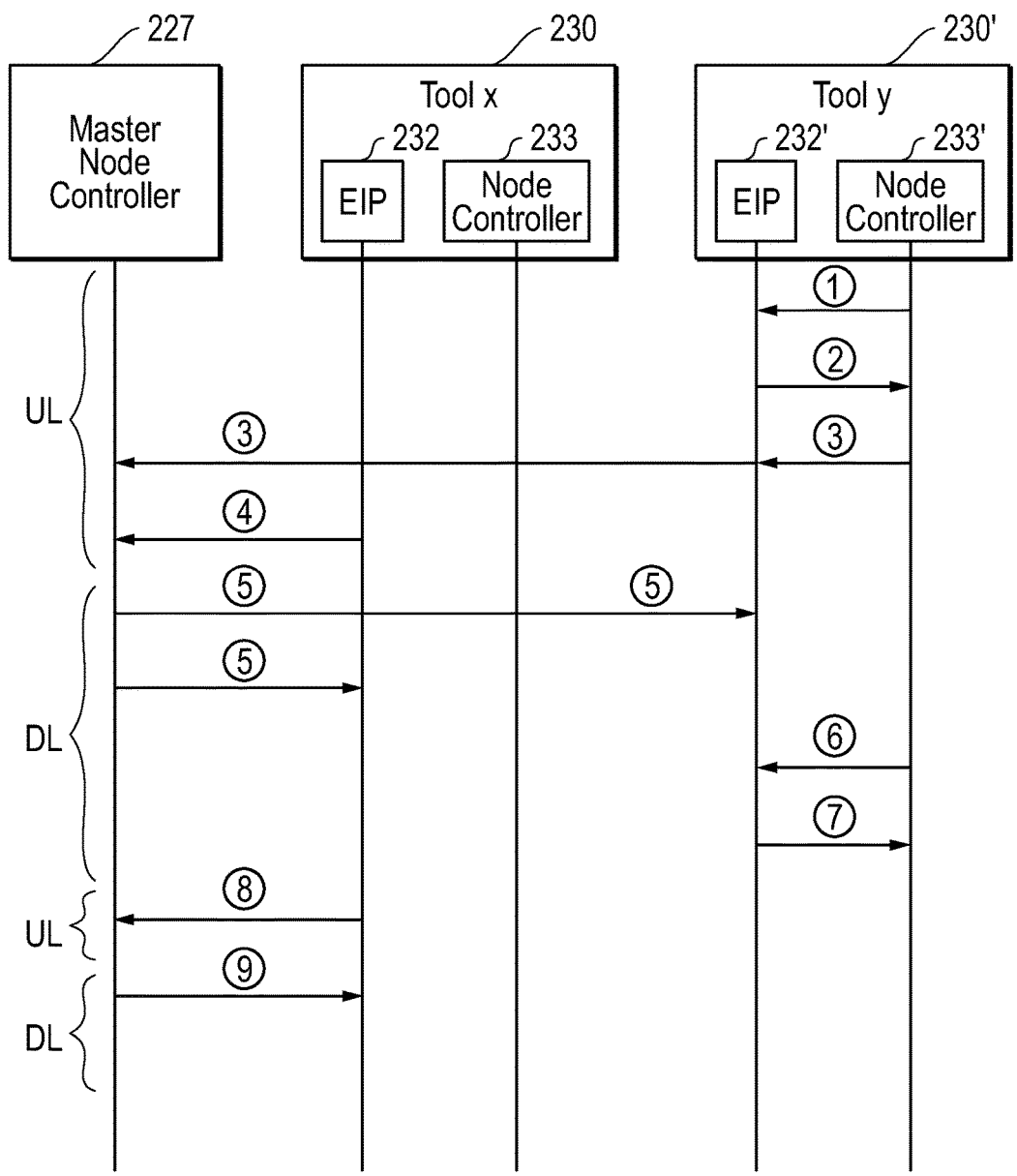
FIG. 3 illustrates a timing schematic for inter-tool communication data flow control in accordance with an embodiment of the present disclosure.

Referring now to FIGS. 2 and 3, a schematic illustrating an example of data flow control over time illustrates a method for data flow control of the inter-tool communication in a cable telemetry system (such as the cable telemetry system 200 of FIG. 2) to ensure message delivery by buffering the inter-tool communication messages in another location and later delivering when the buffer-full status of the receiver is cleared. In addition, additional inter-tool communication message requests are not acknowledged by the system until the clear status.

In the present example, DownholeTool Y 230' (FIG. 3) requests to send an inter-tool message to Downhole Tool X 230. Data is transferred between tools according to the data transfers as indicated by circled numbers 1 through 9. The data transfer is performed by uplink as indicated by UL and downlink as indicated by DL.

In data transfer 1, the tool node controller 233' for Tool Y 230' sends an inter-tool communication request to Tool Y's EIP 232'. In data transfer 2, the tool node controller 233' returns an ACK (acknowledgement) to the tool node controller 233' of Tool Y 230', which allows it to write the inter-tool communication message toward Tool X 230. In data transfer 3-1, the tool node controller 233' of Tool Y 230' then writes the inter-tool communication into the interface package 233'. In data transfer 3-2, the inter-tool communication message toward Tool X 230 is sent to the master node controller 227.

At some point in time, Tool X 230 (the intended recipient) may send a message (in data transfer 4) to the master node controller 227 stating that the command buffer for Tool X 230 is full and unable to accept any new data. In the next downlink period after receiving a command buffer full message, the master node controller 227 sends a command buffer status to the interface packages 232, 232' which are slave nodes (two are shown in this example) stating that Tool X's command buffer is full in data transfer 5.

The message sent by interface package 232' of Tool Y 230' can be buffered in the master node controller 227 (after data transfer 3) and not sent on to the command buffer for Tool X 230 until a later time. Tool Y's 230' inter-tool communication message to Tool X 230 can be later sent in data transfer 9, once Tool X's 230 command buffer is cleared from full status, and a message indicating such is transferred to the master node controller 227 in data transfer 8.

In the meantime, while the command buffer for Tool X 230 is reflecting "full" status, Tool Y's 230' tool node controller 233' requests in data transfer 6 to send a second inter-tool communication message toward Tool X 230. This request is sent to Tool Y's interface package 232'. Tool Y's interface package 232', since receiving a message that Tool X's receiver buffer is full, returns a non-acknowledgement (NAK) in data transfer 7 to Tool Ts tool node controller 233'. The second inter-tool communication message toward Tool X 230 is not sent by Tool Y's 230' tool node controller 233' until Tool X's 230 command buffer has a clear status reported by the master node controller 227. In this case. Tool Y's 230' messages toward Tool X 230 are sent when Tool X 230 has the capacity to receive commands, thereby ensuring that the messages are not lost due to full buffers.

The individual interface packages may be notified in cases where an inter-tool communication receiver node's command buffer is full or a master node controller downlink command buffer is over threshold by a "Buffer Full Nodes" command. When the destination buffer of any given inter-tool communication message is indicated in the "Buffer Full Nodes" command, the master node controller 227 does not send the buffered command to the individual interface package 232, 232', etc. in addition, the respective tool node controllers 233, 233', etc., of the individual tool nodes return a non-acknowledgement (NAK) when additional inter-tool communication messages are requested to be sent, once the master node controller 227 has distributed a buffer full status relating to a particular tool.

Figure 4:
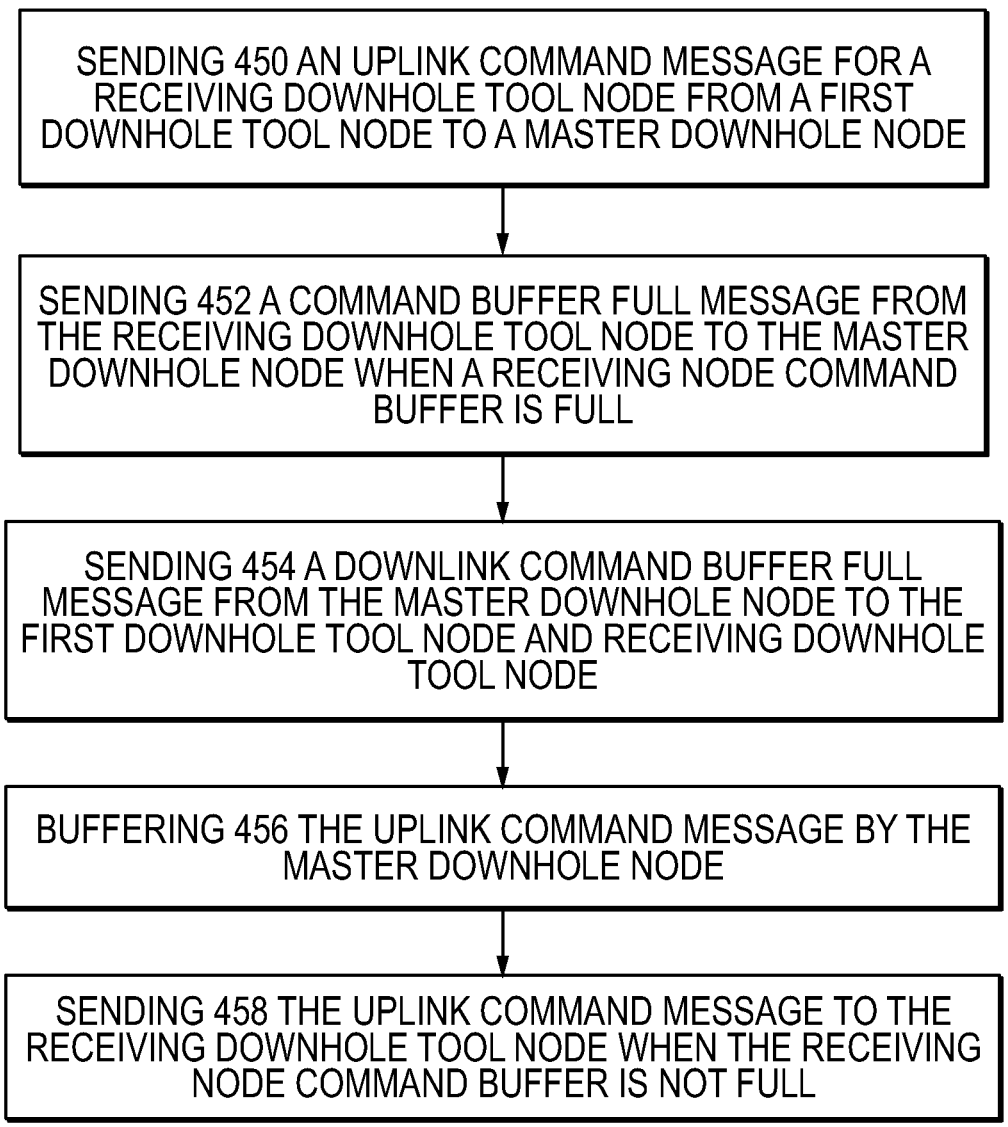
FIG. 4 is a flow chart for a method for inter-tool communication data flow control in a cable telemetry system in accordance with an embodiment of the present disclosure.

Turning now FIG. 4, a flow chart is shown for a method for inter-tool communication data flow control in a toolbus system. The method may involve the data flow control over time for a cable telemetry system as depicted in FIGS. 2 and 3. The method begins with sending 450 an uplink command message for a receiving downhole tool node (i.e., Tool X in the above example) from a sending downhole tool node (i.e., Tool Y in the above example) to a master downhole node.

The method continues with sending 452 a command buffer full message from the receiving downhole tool node to the master downhole node when a receiving node command buffer is full, The method continues with sending 454 a downlink command buffer full message from the master downhole node to the first (or sending) downhole tool node and receiving downhole tool node. The method continues with buffering 456 the uplink command message by the master downhole node. The method continues with sending 458 the uplink command message to the receiving downhole tool node when the receiving node command buffer is not full.

Figure 5:
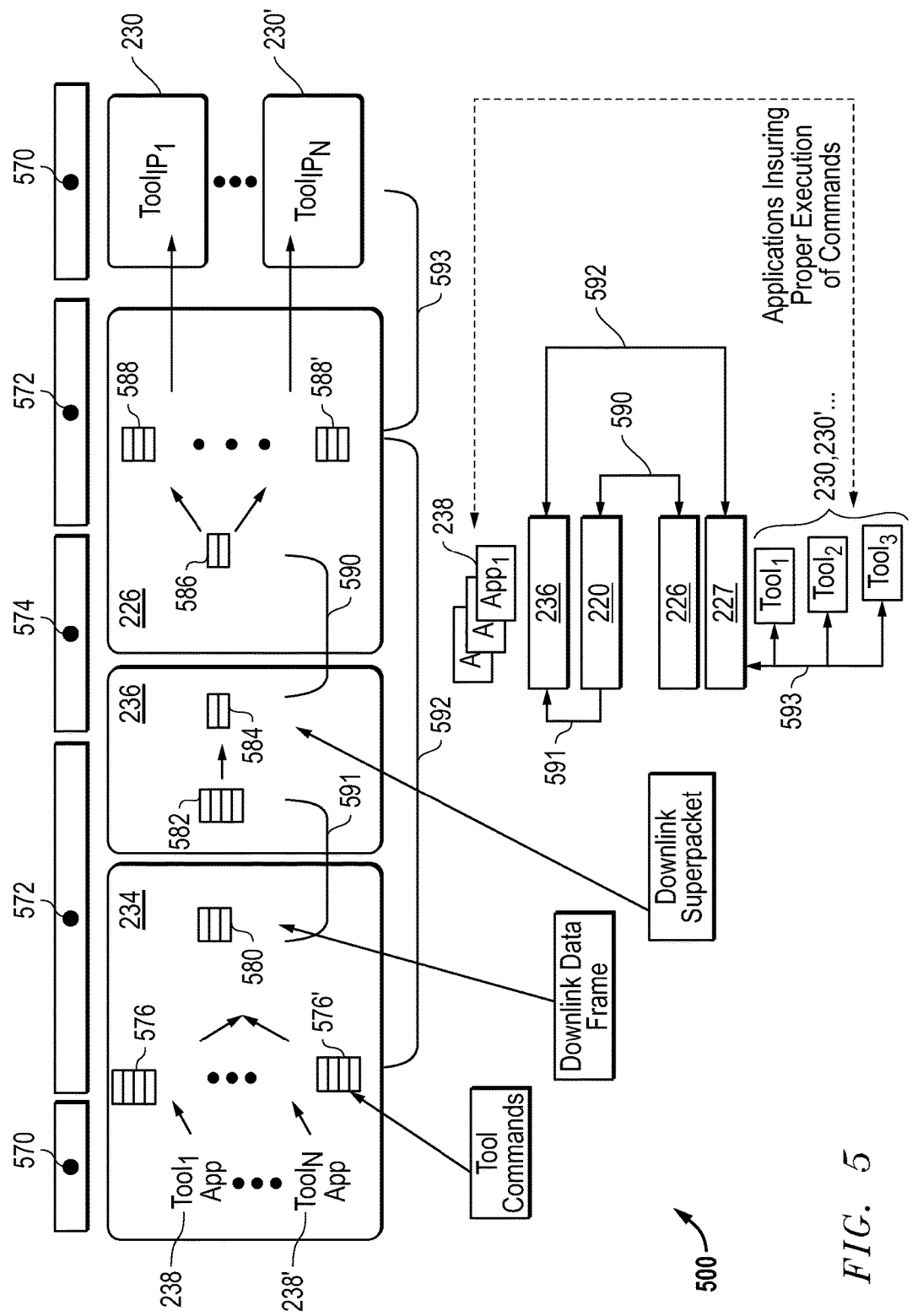
FIG. 5 is a schematic diagram depicting a flow control system in accordance with an embodiment of the present disclosure.

Referring to FIG. 5, flow control system 500 may be outlined as various buffers managed according to three layers 570, 572, 574, as illustrated in the block diagram schematic of FIG. 5. The flow control system 500 incorporates the system of FIG. 2 and depicts operation therewith. In Layer 570, surface tool applications 238, 238', etc.
generate commands, while individual tools 230, 230', etc. consume commands in downlink; and while individual tools 230, 230', etc. generate uplink messages and surface tool applications 238, 238', etc. consume messages in uplink.

In Layer 572, surface computer data dispatcher module 236 manages command tool-specific buffers on the surface, and the corresponding toolbus master node controller 227 manages toolbus-specific buffers in the DTC 226. In Layer 574, cable telemetry manages the delivery of the commands over the physical medium of the cable 114.

A plurality of flow control loops may be maintained across the three layers 570, 572, 574. In Loop 590, flow control may be established for the cable telemetry downlink layer between DTC 226 and surface acquisition front-end unit 119 so that the superpacket buffering space 586 in DTC 226 does not overflow.

The DTM 220 may accomplish various tasks. In the presence of data, the DTM 220 maintains an average downlink data rate as needed based on the physical layer timing. The DTM 220 may stop generating superpackets if there is no data to send. In case of transmission errors, the DTM 220 may re-transmit downlink superpackets. In case the DTC 226 signals "Superpacket Buffer Not Available", the DTM 220 may stop downlink superpacket transmission until the downhole buffer becomes available. The DTM 220 may also empty the superpacket buffer 584 if the telemetry link fails.

As part of Loop 590, the DTC 226 may accomplish various tasks. The DTC 226 may detect a superpacket error and negatively (to the DTM 220) acknowledge had packets. The DTC 226 may maintain the superpacket buffer 584. In case the superpacket buffer 584 becomes full, the DTC 226 may send a "Superpacket Buffer Not Available" status to the DTM 220, as well as send a "Superpacket Buffer Available" to the DTM 220 when the condition changes. The DTC 226 may empty the superpacket buffer 584 if the telemetry link fails, or may do so on command from the DTM 220. The DTC 226 may periodically report the tool node buffer (588, 588', etc.) status to the surface for record-keeping purposes.

In Loop 591, flow control is established for the cable telemetry downlink layer between the surface acquisition front-end unit 119 and surface computer data dispatcher module 236. The surface acquisition front-end unit 119 may accomplish various tasks. The surface acquisition front-end unit 119 may maintain a buffer 582 of downlink commands. Data from the buffer 582 may be used to generate downlink superpackets, thereby decoupling the sending of the data from surface computer 234 from the downlink superpacket generation. The surface acquisition front-end unit 119 may issue "Buffer Not Available" result to surface computer data dispatcher module 236 when the buffer 582 reaches a threshold value. The surface acquisition front-end unit 119 may issue a "Buffer Available" result to surface computer data dispatcher module 236 when the condition changes. The surface acquisition front-end unit 119 may empty the buffer 582 if the telemetry link fails.

The surface computer data dispatcher module 236 may accomplish two flow control tasks in Loop 591. The surface computer data dispatcher module 236 may deliver downlink data to a buffer 580 of the surface acquisition front-end 119 in response to a message of "Buffer Available." The surface computer data dispatcher module 236 may stop delivery in response to a message of "Buffer Not Available."

In Loop 592, flow control may be established for the cable telemetry downlink layer between the buffers at the master node controller 227 (i.e., a buffer specific to each tool) and the node command buffer 582, 584 (also tool-node specific to each tool).

The master node controller 227 may accomplish various tasks. The master node controller 227 may maintain a separate buffer (588, 588', etc.) for each tool string interface package (i.e., IP, EIP or EIP 2.0) in the toolstring. The interface package may be, for example, part of controller 232, 232', etc. of FIG. 2. The master node controller 227 may issue a "IP XX Buffer Not Available" to surface computer data dispatcher module 236 when the buffer (588, 588', etc.) for a particular IP, EIP or EIP 2.0 reaches a certain threshold percentage of its maximum value. For example, in an embodiment, a threshold value can be configurable from the surface according to the system selection based on the latency, or round trip time, differences. The master node controller 227 may issue an "IP XX Buffer Available" to surface computer data dispatcher module 236 when the buffer for that IP, EIP or EIP 2.0 goes below the threshold value.

The master node controller 227 may empty the buffers if the telemetry link fails, or on command from the surface computer 234. The master node controller 227 may periodically report the tool node buffer (588, 588', etc.) status to the surface for record-keeping purposes. The surface computer data dispatcher module 236 may accomplish various tasks related to Loop 593. The surface computer data dispatcher module 236 may maintain a separate buffer for each IP, EIP or EIP 2.0 in the toolstring, which may be implemented at any size or in any manner. The surface computer data dispatcher module 236 may allow an application for tool XX to write into the buffer (576 or 576') if DTC 226 has sent a message "Downlink IP XX Buffer Available," and conversely, may not allow the application to write if the buffer (576 or 576') is not available, and instead at its own local buffer 580 until space permits. The surface computer data dispatcher module 236 may dispatch commands from each buffer in such a way as to enable each tool to have the ability to send its commands. In Loop 593, flow control is established for the cable telemetry downlink layer between the master node controller 227 and tool node controllers 233, 233', etc. The master node controller 227 may maintain a separate buffer (588, 588', etc.) for each IP, EIP or EIP 2.0 in the toolstring. The master node controller 227 may send a command to an IP, EIP or EIP 2.0 when the tool's node controller is ready to accept the next command. The master node controller 227 may send the tool commands to each tool as quickly as possible, given the IP status feedback from the tools (e.g., acknowledgement", "downlink buffer overflow" and "downlink buffer full" are represented each by a single bit within the IP status word in packet header) when dealing with IP/EIP slave nodes and similarly send tool commands to an EIP 2.0 tool as fast as possible given the EIP 2.0 status feedback. The master node controller 227 may buffer a command in a tool specific buffer 586 until the tool is ready to accept the command. The tool node controllers 233, 233', etc. may receive and check data, as well as send status information to the master node controller 227 to allow the master node controller 227 to regulate the flow.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plans-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, for any limitations of any of the claims herein, except for those in which the claim expressly uses the words 'means for' together with an associated function.

What is claimed is:

1. A method for delivering an inter-tool communication message from a first downhole tool to a second downhole tool over a toolbus, the method comprising:
    positioning a downhole telemetry cartridge into a wellbore via a cable, the downhole telemetry cartridge comprising the first downhole tool, the second downhole tool, the toolbus, and a master node controller, the first downhole tool and the second downhole tool being operatively coupled to the master node controller via the toolbus, the first downhole tool including a first buffer, the second downhole tool including a second buffer, the master node controller including a third buffer;
    generating the inter-tool communication message at the first downhole tool;
    transmitting the inter-tool communication message from the first downhole tool to the master node controller over the toolbus;
    transmitting a first buffer status message from the second downhole tool to the master node controller over the toolbus, the first buffer status message indicating that the second buffer of the second downhole tool is full;
    transmitting the first buffer status message from the master node controller to the first downhole tool and the second downhole tool over the toolbus;
    in response to the first buffer status message being received at the master node controller from the second downhole tool over the toolbus, buffering the inter-tool communication message at the third buffer of the master node controller;
    transmitting a second buffer status message from the second downhole tool to the master node controller over the toolbus during the buffering of the inter-tool communication message at the third buffer of the master node controller, the second buffer status message indicating that the second buffer of the second downhole tool is no longer full; and
    in response to the second buffer status message being received at the master node controller from the second downhole tool over the toolbus, transmitting the inter-tool communication message from the third buffer of the master node controller to the second buffer of the second downhole tool over the toolbus, the inter-tool communication message not leaving the downhole telemetry cartridge between the generating of the inter-tool communication message at the first downhole tool and the transmitting of the inter-tool communication message from the master node controller to the second downhole tool.

2. The method of claim 1, wherein generating the inter-tool communication message at the first downhole tool comprises transmitting a first inter-tool communication message request from a controller of the first downhole tool to an interface package of the first downhole tool.

3. The method of claim 2, wherein generating the inter-tool communication message at the first downhole tool further comprises returning an acknowledgement from the interface package of the first downhole tool to the controller of the first downhole tool prior to the first downhole tool receiving the first buffer status message from the master node controller.

4. The method of claim 3, wherein generating the inter-tool communication message at the first downhole tool further comprises transmitting a write command message from the controller of the first downhole tool to the interface package of the first downhole tool in response to the acknowledgment being received at the controller of the first downhole tool.

5. The method of claim 3, further comprising:
    transmitting a second inter-tool communication message request from the controller of the first downhole tool to the interface package of the first downhole tool; and
    returning a non-acknowledgement from the interface package of the first downhole tool to the controller of the first downhole tool subsequent to the first buffer status message being received at the first downhole tool and prior to the second buffer status message being received at the second downhole tool.

6. The method of claim 5, further comprising inhibiting a transmitting of a command message from the controller of the first downhole tool to the interface package of the first the downhole tool in response to the non-acknowledgment being received at the controller of the first downhole tool.

7. A system for delivering an inter-tool communication message from a first downhole tool to a second downhole tool over a toolbus, the system comprising:
    a downhole telemetry cartridge deployable into a wellbore via a cable, the downhole telemetry cartridge comprising the first downhole tool, the second downhole tool, the toolbus, and a master node controller, the first downhole tool and the second downhole tool being operatively coupled to the master node controller via the toolbus, the first downhole tool including a first buffer, the second downhole tool including a second buffer, the master node controller including a third buffer, the master node controller to:
    receive the inter-tool communication message, the inter-tool communication message being generated at the first downhole tool and transmitted from the first downhole tool to the master node controller over the toolbus;
    receive a first buffer status message transmitted from the second downhole tool to the master node controller over the toolbus, the first buffer status message indicating that the second buffer of the second downhole tool is full;
    transmit the first buffer status message from the master node controller to the first downhole tool;
    in response to the first buffer status message being received at the master node controller from the second downhole tool over the toolbus, buffer the inter-tool communication message at the third buffer of the master node controller;
    receive a second buffer status message transmitted from the second downhole tool to the master node controller over the toolbus during the buffering of the inter-tool communication message at the third buffer of the master node controller, the second buffer status message indicating that the second buffer of the second downhole tool is no longer full; and in response to the second buffer status message being received at the master node controller from the second downhole tool over the toolbus, transmit the inter-tool communication message from the third buffer of the master node controller to the second buffer of the second downhole tool over the toolbus, the inter-tool communication message not to leave the downhole telemetry cartridge between the inter-tool communication message being generated at the first downhole tool and the inter-tool communication message being transmitted from the master node controller to the second downhole tool.

8. The system of claim 7, wherein the first downhole tool is to generate the inter-tool communication message by transmitting a first inter-tool communication message request from a controller of the first downhole tool to an interface package of the first downhole tool.

9. The system of claim 8, wherein the first downhole tool is further to generate the inter-tool communication message by returning an acknowledgement from the interface package of the first downhole tool to the controller of the first downhole tool prior to the first downhole tool receiving the first buffer status message from the master node controller.

10. The system of claim 9, wherein the first downhole tool is further to generate the inter-tool communication message by transmitting a write command message from the controller of the first downhole tool to the interface package of the first downhole tool in response to the acknowledgment being received at the controller of the first downhole tool.

11. The system of claim 9, wherein the first downhole tool is further to:
transmit a second inter-tool communication message request from the controller of the first downhole tool to the interface package of the first downhole tool; and
return a non-acknowledgement from the interface package of the first downhole tool to the controller of the first downhole tool subsequent to the first buffer status message being received at the first downhole tool and prior to the second buffer status message being received at the second downhole tool.

12. The system of claim 11, wherein the first downhole tool is further to inhibit a transmitting of a command message from the controller of the first downhole tool to the interface package of the first downhole tool in response to the non-acknowledgment being received at the controller of the first downhole tool.

13. The system of claim 7, wherein master node controller is further to transmit the first buffer status message from the master node controller to the second downhole tool.

14. A method for delivering an inter-tool communication message, the method comprising:
generating the inter-tool communication message at a first downhole tool of a downhole telemetry cartridge positioned within a wellbore, the downhole telemetry cartridge comprising the first downhole tool, a second downhole tool, a toolbus, and a master node controller, the first downhole tool and the second downhole tool being operatively coupled to the master node controller via the toolbus, the first downhole tool including a first buffer, the second downhole tool including a second buffer, the master node controller including a third buffer;

transmitting the inter-tool communication message from the first downhole tool to the master node controller over the toolbus;
transmitting a first buffer status message from the second downhole tool to the master node controller over the toolbus, the first buffer status message indicating that the second buffer of the second downhole tool is full;
transmitting the first buffer status message from the master node controller to the first downhole tool;
in response to the first buffer status message being received at the master node controller from the second downhole tool over the toolbus, buffering the inter-tool communication message at the third buffer of the master node controller;
transmitting a second buffer status message from the second downhole tool to the master node controller over the toolbus during the buffering of the inter-tool communication message at the third buffer of the master node controller, the second buffer status message indicating that the second buffer of the second downhole tool is no longer full; and
in response to the second buffer status message being received at the master node controller from the second downhole tool over the toolbus, transmitting the inter-tool communication message from the third buffer of the master node controller to the second buffer of the second downhole tool over the toolbus, the inter-tool communication message not leaving the downhole telemetry cartridge between the generating of the inter-tool communication message at the first downhole tool and the transmitting of the inter-tool communication message from the master node controller to the second downhole tool.

15. The method of claim 14, wherein generating the inter-tool communication message at the first downhole tool comprises transmitting a first inter-tool communication message request from a controller of the first downhole tool to an interface package of the first downhole tool.

16. The method of claim 15, wherein generating the inter-tool communication message at the first downhole tool further comprises returning an acknowledgement from the interface package of the first downhole tool to the controller of the first downhole tool prior to the first downhole tool receiving the first buffer status message from the master node controller.

17. The method of claim 16, wherein generating the inter-tool communication message at the first downhole tool further comprises transmitting a write command message from the controller of the first downhole tool to the interface package of the first downhole tool in response to the acknowledgment being received at the controller of the first downhole tool.

18. The method of claim 16, further comprising:
transmitting a second inter-tool communication message request from the controller of the first downhole tool to the interface package of the first downhole tool; and
returning a non-acknowledgement from the interface package of the first downhole tool to the controller of the first downhole tool subsequent to the first buffer status message being received at the first downhole tool and prior to the second buffer status message being received at the second downhole tool.

19. The method of claim 18, further comprising inhibiting a transmitting of a command message from the controller of the first downhole tool to the interface package of the first downhole tool in response to the non-acknowledgment being received at the controller of the first downhole tool.

20. The method of claim 14, further comprising transmitting the first buffer status message from the master node controller to the second downhole tool.

\* \* \* \* \*